US012759884B2

(12) United States Patent
Lee et al.

(10) Patent No.: US 12,759,884 B2
(45) Date of Patent: Oct. 13, 2026

(54) ANODE MATERIAL FOR LITHIUM SECONDARY BATTERY, METHOD FOR PREPARING SAME, AND LITHIUM SECONDARY BATTERY

(71) Applicant: RESEARCH INSTITUTE OF INDUSTRIAL SCIENCE & TECHNOLOGY, Pohang-si (KR)

(72) Inventors: Gang Ho Lee, Pohang-si (KR); Sei Min Park, Pohang-si (KR); Jung-Chul An, Pohang-si (KR); Jong Hoon Yoon, Pohang-si (KR); Hyun-Chul Jo, Pohang-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 1021 days.

(21) Appl. No.: 17/921,749

(22) PCT Filed: Feb. 3, 2021

(86) PCT No.: PCT/KR2021/001433
§ 371 (c)(1),
(2) Date: Apr. 20, 2023

(87) PCT Pub. No.: WO2021/221276
PCT Pub. Date: Nov. 4, 2021

(65) Prior Publication Data

US 2024/0051831 A1 Feb. 15, 2024

(30) Foreign Application Priority Data

Apr. 28, 2020 (KR) ........................ 10-2020-0051438

(51) Int. Cl.
*C01B 32/205* (2017.01)
*H01M 10/052* (2010.01)

(52) U.S. Cl.
CPC ......... *C01B 32/205* (2017.08); *H01M 10/052* (2013.01); *C01P 2004/61* (2013.01); *C01P 2006/40* (2013.01)

(58) Field of Classification Search
None
See application file for complete search history.

(56) References Cited

U.S. PATENT DOCUMENTS 6,150,055 A 11/2000 Kato et al.
6,524,748 B1 2/2003 Kato et al.
(Continued)

FOREIGN PATENT DOCUMENTS

CN 1726168 1/2006
CN 106532044 3/2017
(Continued)

OTHER PUBLICATIONS

KIPO, Office Action of KR 10-2020-0051438 dated Jan. 10, 2025, total 4 pages.
(Continued)

*Primary Examiner* — Kevin M Bernatz
(74) *Attorney, Agent, or Firm* — LEX IP MEISTER, PLLC

(57) ABSTRACT

A present disclosure is related to a method of manufacturing a negative electrode active material for lithium secondary battery:

preparing a primary particle by grinding a carbon source containing 10 to 25 wt % volatile matter; heating and kneading the primary particle to assemble them into a secondary particle; and graphitizing the secondary particle; wherein, the step of assembling the secondary particle is the step of heating and kneading only the primary particle without adding a binder. In addition, it is provided a negative electrode active material for a (Continued)

lithium secondary battery has a retention of 80% discharge capacity of 20 cycles or more.

15 Claims, 1 Drawing Sheet

(56) References Cited

U.S. PATENT DOCUMENTS

| | | | | |
|---|---|---|---|---|
| 7,816,037 | B2 * | 10/2010 | Ohta | H01M 4/587 429/231.95 |
| 12,658,443 | B2 * | 6/2026 | Shen | H01M 4/587 |
| 2010/0214722 | A1 * | 8/2010 | Fujii | C01B 32/342 423/460 |
| 2012/0043684 | A1 * | 2/2012 | Komatsu | C04B 35/6269 264/104 |
| 2017/0110728 | A1 * | 4/2017 | Kobayashi | H01M 4/133 |
| 2020/0083536 | A1 | 3/2020 | Lee et al. | |
| 2022/0123307 | A1 * | 4/2022 | Li | H01M 4/1393 |

FOREIGN PATENT DOCUMENTS

| | | |
|---|---|---|
| CN | 107369823 | 11/2017 |
| CN | 110642247 | 1/2020 |
| EP | 3621132 | 3/2020 |
| JP | 3690128 | 8/2005 |
| JP | 2014-086237 | 5/2014 |
| JP | 5596254 | 9/2014 |
| JP | 2020-043069 | 3/2020 |
| KR | 10-2008-0049669 | 6/2008 |
| KR | 10-1417588 | 7/2014 |
| KR | 10-1840054 | 3/2018 |
| KR | 10-2019-0054045 | 5/2019 |
| KR | 10-2019-0143620 | 12/2019 |
| WO | 03/063274 | 7/2003 |
| WO | 2019/035580 | 2/2019 |

OTHER PUBLICATIONS

KIPO, PCT Search Report & Written Opinion of PCT/KR2021/001433 dated May 10, 2021.
SIPO, Office Action of CN 202180031858.2 dated May 25, 2023.

* cited by examiner

【FIG. 1】
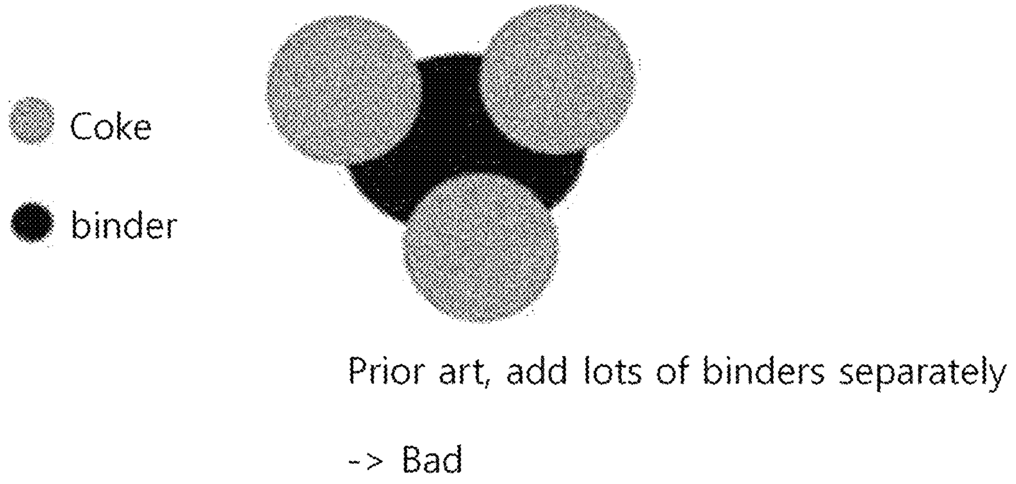
【FIG. 2】
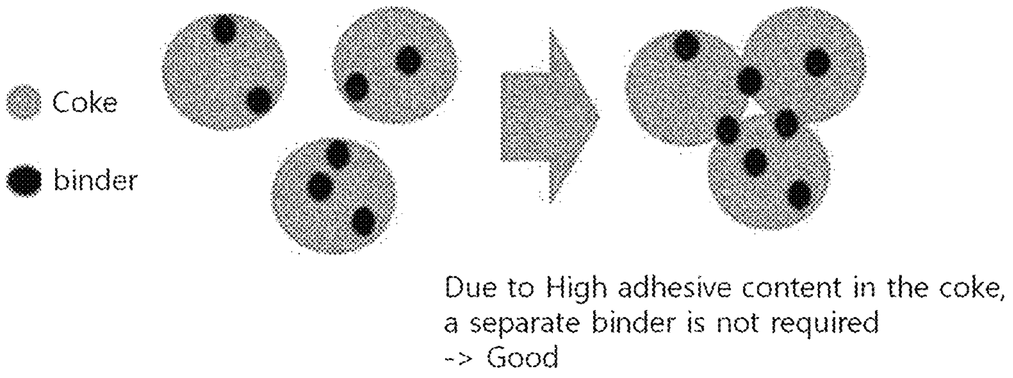

ANODE MATERIAL FOR LITHIUM SECONDARY BATTERY, METHOD FOR PREPARING SAME, AND LITHIUM SECONDARY BATTERY

CROSS-REFERENCE TO RELATED APPLICATION

This application claims priority to and the benefit of Korean Patent Application No. 10-2020-0051438 filed in the Korean Intellectual Property Office on Apr. 28, 2020, the entire contents of which are incorporated herein by reference.

BACKGROUND OF THE INVENTION

(a) Field of the Invention

The present disclosure is related to a negative electrode material, method of preparing the same and lithium secondary battery.

(b) Description of the Related Art

Since the graphite/carbon-based negative electrode active material used as the negative electrode of the lithium secondary battery has a potential close to the electrode potential of lithium metal, the change in crystal structure during the intercalation and deintercalation of ionic lithium is small, enabling a continuous and repeated oxidation reduction reaction at the electrode, providing the basis for the lithium secondary battery to exhibit high capacity and excellent cycle-life.

Various types of materials are used as carbon-based negative electrode active materials, such as natural graphite and artificial graphite, which are crystalline carbon-based materials, or hard carbon and soft carbon, which are amorphous carbon-based materials. Among them, graphite-based active materials are the most widely used, as they are highly reversible and can improve the cycle-life characteristic of lithium secondary batteries. Since graphite active material has a lower discharge voltage of −0.2 V compared to lithium, a battery with graphite active material can exhibit a discharge voltage as high 3.6V. Therefore, it offers many advantages over lithium secondary batteries in terms of energy density.

An artificial graphite, a crystalline carbon-based material, has a more stable crystal structure than natural graphite because it is made by applying high heat energy of more than 2,700° C. to create the crystal structure of graphite. Even with repeated charging and discharging of lithium ions, the crystal structure changes are small, resulting in a relatively long cycle-life. In general, an artificial graphite-based negative electrode active material has a cycle-life that is two to three times longer than natural graphite.

Soft carbon and hard carbon, which are amorphous carbonaceous materials with unstabilized crystal structures, are characterized by smoother entry of lithium ions. Therefore, it can be used in electrodes that require fast charging because it can increase the charge and discharge speed.

Considering the cycle-life characteristic and output characteristic of the lithium secondary battery to be used, it is common to use a mixture of the above carbon-based materials in a certain ratio to each other.

Meanwhile, improving high temperature performance (storage characteristics at a high temperature and high temperature cycle characteristic) in a lithium secondary battery is an important challenge. If the total internal pore volume is high after the negative electrode active material is applied to the current collector and rolled, the high temperature performance of the negative electrode is likely to be deteriorated. Therefore, it is necessary to improve the high temperature characteristic of lithium secondary batteries by minimizing the changes in electrode structure and internal total pore volume that occur during electrode rolling.

In particular, when developing negative electrode materials for fast-charging secondary batteries, improvement of high temperature characteristic is further required.

With the technological development and increasing demand for mobile devices, the demand for secondary batteries as an energy source is increasing rapidly. Among such secondary batteries, lithium secondary batteries, which exhibit high energy density and operating potential, long cycle characteristic, and low self-discharge rate, are commercially available and widely used.

In addition, as interest in environmental issues grows, there is a growing interest in electric vehicles and hybrid electric vehicles that can replace vehicles that use fossil fuels, such as gasoline and diesel vehicles, which are major problem of air pollution. Research on the use of lithium secondary batteries as a power source for such electric vehicles and hybrid electric vehicles is actively underway.

A lithium secondary battery is a secondary battery that is generally composed of a positive electrode containing a positive electrode active material, a negative electrode containing a negative electrode active material, a separator and an electrolyte, and is charged and discharged by the intercalation-deintercalation of lithium ions. Lithium secondary batteries have the merits of high energy density, large electromotive force, and high-capacity, so they are applied in various fields.

Metal oxides such as $LiCoO_2$, $LiMnO_2$, $LiMn_2O_4$ or $LiCrO_2$ are utilized as a positive electrode active material to form the positive electrode of a lithium secondary battery. As the negative electrode active material, lithium metal, a carbon-based material such as graphite or activated carbon, or silicon oxide (SiOx) are used.

Among the negative electrode active materials, lithium metal was mainly used in the early days, but as the charge and discharge cycle progresses, lithium atoms grow on the surface of lithium metal and damage the separator, causing the battery to break, so carbon-based materials are mainly used in recent years. Graphite-based materials exhibit excellent capacity retention characteristics and efficiency, and their theoretical capacity values (e.g., about 372 mAh/g for $LiC_6$ negative electrode) are still somewhat insufficient for the high energy and high-power density theoretical characteristics required by the relevant markets.

In particular, with the rapid rise of electric vehicles (EVs) in recent years, there is a growing need to improve the fast charging characteristic of lithium ion secondary batteries while preserving the existing capacity. This improvement in fast charging can only be attributed to the role of the active material of the negative electrode, which is responsible for the storage of lithium ions during charging. Since the active material of the negative electrode is mainly composed of carbon/graphite-based materials, it is important to form a stable SEI (Solid Electrolyte Interface) during charging.

In terms of fast charging and life-cycle (stability), an artificial graphite has been the most seamlessly adopted, and we expect this trend to continue. In the manufacture of artificial graphite, a needle cokes on which it is based is mainly petroleum needle cokes or based on coal tar. In general, coke particles (primary particles) that are ground to a certain particle size are mixed with binder pitch to form secondary particles, which are then used to make negative electrode materials.

SUMMARY OF THE INVENTION

The binder used to manufacture the negative electrode active material for lithium secondary batteries is soft carbon, which is good in terms of capacity, but it should be used minimally because soft carbon develops a mesoporous structure that is unsuitable for intercalation or deintercalation lithium ions, after manufacturing the negative electrode material through graphitization. However, with the recent increase in requirements for secondary batteries in EVs, reducing an amount of binder is not enough.

Accordingly, the present disclosure proposes a binderless negative electrode material that does not utilize a binder. We want to provide a negative electrode material through self-assembly using green cokes with high organic volatile matter content.

A present disclosure is related to a method of manufacturing a negative electrode active material for lithium secondary battery: preparing a primary particle by grinding a carbon source containing 10 to 25 wt % volatile matter; heating and kneading the primary particle to assemble them into a secondary particle; and graphitizing the secondary particle. Wherein, the step of assembling the secondary particle is the step of heating and kneading only the primary particle without adding a binder.

The carbon source is a petroleum-based green coke or a coal-based green coke or a mixture thereof.

The carbon source is an isostatic coke or a needle coke or a mixture thereof.

The step of heating and kneading a primary particle to assemble them into a secondary particle; is the process of heating and kneading from room temperature to 300 to 500° C. at a heating rate of at least 3° C./min.

In the step of heating and kneading a primary particle to assemble it into a secondary particle, the kneading and assembling time is 10 minutes or more.

Before the step of heating and kneading a primary particle to assemble them into a secondary particle, a step of kneading a crushed primary particle at room temperature for at least 1 hour is further comprised.

After the step of heating and kneading a primary particle to assemble them into a secondary particle, a step of cooling naturally the assembled secondary particle is further comprised.

The step of natural cooling of the assembled secondary particle is performed for at least 1 hour in a sigma blade biaxial type mixer.

In the step of preparing a primary particle by grinding a carbon source containing 10 to 25 wt % volatile matter, the grinded primary particle has a particle size D50 of 5 to 20 μm.

After the step of heating and kneading a primary particle to assemble it into a secondary particle, a step of coating the secondary particle with a thermoplastic resin.

The step of coating the secondary particle with a thermoplastic resin is performed by 1 to 5 wt % of the thermoplastic resin by weight of the secondary particle.

Before the graphitizing the secondary particle, a step of carbonizing the secondary particle is further comprised.

The step of carbonizing the secondary particle is performed that the assembled secondary particle is carbonized at a temperature of 600 to 1500° C.

The step of graphitizing the secondary particle is performed that the carbonized secondary particle is graphitized at a temperature of 2400 to 3300° C.

The step of heating and kneading a primary particle to assemble them into a secondary particle is performed by one or more of the following: a V-mixer, a Nauta mixer, and a generic Planetary mixer, or combination thereof.

A present disclosure is related to a negative electrode active material for a lithium secondary battery comprising: a primary particle as a carbon source containing 10 to 25 wt % volatile matter, and wherein, a retention of 80% discharge capacity is 20 cycles or more.

A tap density of the negative electrode active material is greater than or equal to 0.8 g/cc.

The negative electrode active material further comprises a thermoplastic coating of 1 to 5 wt % by the entire weight of the negative electrode active material.

According to the present disclosure, it may be possible to utilize the high organic volatile content of green coke for secondary particle assembly without a binder.

According to the present disclosure, low-cost green coke, which has traditionally been underutilized due to its high organic volatile matter (VM) content, can be utilized as a raw material.

According to the present disclosure, the green coke is assembled as a secondary particle without calcination, which facilitates the realization of the original properties of the coke and reduces process costs.

According to the present disclosure, the organic volatile matter (VM) in green coke is retained and has the advantage of acting as an adhesive during secondary particle assembly and thus has a high affinity for the base material.

BRIEF DESCRIPTION OF THE DRAWINGS

FIG. 1 is a schematic view of coke and binder with a large amount of binder added separately according to a conventional manufacturing method.

FIG. 2 is a schematic view of a coke that is assembled without the inclusion of a separate binder by increasing the content of a binder like component in the coke, according to one embodiment of the present invention.

DETAILED DESCRIPTION OF THE EMBODIMENTS

Terms such as first, second and third are used to describe, but are not limited to, the various parts, components, region, layers and/or sections. These terms are used only to distinguish one part, component, region, layer, or section from another part, component, area, layer, or section. Accordingly, a first part, component, region, layer or section described herein may be referred to as a second part, component, region, layer or section without departing from the scope of the present invention.

The technical terms used herein are intended to refer only to certain exemplary embodiments and are not intended to limit the present invention. The singular forms used here include plural forms unless the context clearly indicates the opposite. The meaning of "comprising" as used in a specification is to specify a particular characteristic, region, integer, step, behavior, element, and/or component, and does not exclude the existence or added any other characteristic, region, integer, step, behavior, element, and/or component.

When we say that a part is "on" or "above" another part, it may be directly on or above the other part, or it may entail another part in between. In contrast, when we say that something is "directly on" of something else, we don't interpose anything between them.

Also, unless otherwise noted, "%" refers to "wt %", where 1 ppm is 0.0001 wt %.

Unless otherwise defined, all terms used herein, including technical and scientific terms, have the same meaning as commonly understood by a person of ordinary skill in the technical field to which the present invention belongs. Commonly used dictionary-defined terms are further construed to have meanings consistent with the relevant technical literature and the present disclosure, and are not to be construed in an idealized or highly formal sense unless defined.

Hereinafter, an exemplary embodiment of the present invention will be described in detail so that a person of ordinary skill in the technical field to which the present invention belongs may readily practice it. As those skilled in the art would realize, the described embodiments may be modified in various different ways, all without departing from the spirit or scope of the present invention.

Hereinafter, each step will be described in detail.

A present disclosure is related to a method of manufacturing a negative electrode active material for lithium secondary battery: preparing a primary particle by grinding a carbon source containing 10 to 25 wt % volatile matter; heating and kneading the primary particle to assemble them into a secondary particle; and graphitizing the secondary particle. Wherein, the step of assembling the secondary particle is the step of heating and kneading only the primary particle without adding a binder. The present disclosure is characterized in that, in manufacturing a negative electrode active material for a lithium secondary battery, the secondary particle is assembled by bonding with the primary particle itself, without introducing a binder that is conventionally required to be included.

The carbon source is a petroleum-based green coke or a coal-based green coke or a mixture thereof.

The carbon source is an isostatic coke or a needle coke or a mixture thereof.

The step of heating and kneading a primary particle to assemble them into a secondary particle; is the process of heating and kneading from room temperature to 300 to 500° C. at a heating rate of at least 3° C./min. If the temperature is lower than the range, there may be a problem that the adhesion effect of organic volatile matter (VM) does not appear, making it difficult to assemble with secondary particles. If the temperature is higher than the range, there is a problem that organic volatile matter (VM) vaporizes and erupts rapidly, causing cracks in the assembled secondary particle structure, resulting in an unassembled particle.

In conventional negative electrode active material manufacturing, a binder was used, so it was necessary to raise the temperature above the softening point of the binder to assemble it into secondary particles, which consumed a lot of energy. However, the manufacturing method of the negative electrode active material for a lithium secondary battery of the present disclosure does not use a binder for secondary particle assembly, and thus has the advantage of being able to assemble at a temperature lower than the softening point of the binder, thereby saving energy.

In the step of heating and kneading a primary particle to assemble it into a secondary particle, the kneading and assembling time is 10 minutes or more. Specifically, the time to assemble can be from 10 minutes to 3 hours or less, and more specifically from 2 hours to 3 hours.

Before the step of heating and kneading a primary particle to assemble them into a secondary particle, a step of kneading a crushed primary particle at room temperature for at least 1 hour is further comprised.

After the step of heating and kneading a primary particle to assemble them into a secondary particle, a step of cooling naturally the assembled secondary particle is further comprised.

The step of natural cooling of the assembled secondary particle is performed for at least 1 hour in a sigma blade biaxial type mixer. During this natural cooling phase, the assembled secondary particles are further compressed, which can increase the adhesion effect of the VM.

In the step of preparing a primary particle by grinding a carbon source containing 10 to 25 wt % volatile matter, the grinded primary particle has a particle size D50 of 5 to 20 μm. Specifically, the particle size D50 may be 10 to 20 μm, more specifically 14 to 19 μm.

The particle grinding is not limited to those typically used to grind graphite material, and may be one or more types selected from the group consisting of, for example, jet mills, pin mills, air classifier mills, and jaw crushers.

If the particles are too small or too large, there may be a drawback of poor discharge capacity (below 350 mAh/g) or low efficiency. Also, if the grain size is excessively large, it may cause damage to the current collector when applied, such as warping the current collector.

After the step of heating and kneading a primary particle to assemble it into a secondary particle, a step of coating the secondary particle with a thermoplastic resin. In this case, the thermoplastic resin is not limited to those used as coatings in the conventional negative electrode active material field, and the same can be used as the binder pitch. For example, it could be a coal-based pitch, an petroleum-based pitch, or a combination thereof.

The step of coating the secondary particle with a thermoplastic resin is performed by 1 to 5 wt % of the thermoplastic resin by weight of the secondary particle. For example 2 to 4 wt %, more specifically, it may be 3 wt %.

The method may further comprise heating and kneading the primary particles to assemble them into a secondary particle; and subsequently carbonizing the secondary particle. If the secondary particle is coated with a thermoplastic resin, the secondary particle may further comprise a carbonization step after the secondary particle is coated with the thermoplastic resin.

The step of carbonizing the secondary particle is performed that the assembled secondary particle is carbonized at a temperature of 600 to 1500° C. Specifically, the carbonization temperature may be a temperature of 800 to 1200° C., or more specifically, the carbonization temperature may be 900 to 1100° C., more specifically 1000° C.

The step of graphitizing the secondary particle is performed that the carbonized secondary particle is graphitized at a temperature of 2400 to 3300° C. Specifically, the graphitization temperature may be 2600 to 3200° C., more specifically 2800 to 3100° C., or 2900 to 3000° C.

The step of heating and kneading a primary particle to assemble them into a secondary particle is performed by one or more of the following: a V-mixer, a Nauta mixer, and a generic Planetary mixer, or combination thereof.

A present disclosure is related to a negative electrode active material for a lithium secondary battery comprising: a primary particle as a carbon source containing 10 to 25 wt % volatile matter, and wherein, a retention of 80% discharge capacity is 20 cycles or more.

The negative electrode active material for the lithium secondary battery may have a tap density of 0.8 g/cc or more. Specifically, the tap density can be from 0.8 to 1.1 g/cc.

The negative electrode active material for the lithium secondary battery may further comprise a thermoplastic resin coating in an amount of 1 to 5 wt % based on the entire weight of the negative electrode active material. Specifically, the thermoplastic resin may include 2 to 4 wt %, more specifically 3 wt %.

Hereinafter, an exemplary embodiment of the present invention will be described in detail so that a person of ordinary skill in the art to which the present invention belongs may readily practice it. However, the present invention can be implemented in many different forms and is not limited to the exemplary embodiment described herein.

Experimental Example 1—Electrochemical Performance Evaluation According to Primary Particle Size (1) Manufacture of Negative Electrode Active Material Coal-based green coke with an organic volatile matter (VM) content of 15 wt % was ground to of a different D50 as shown in Table 1 to prepare the primary particles. Grinding was performed using a jet mill. After grinding, the particle size was adjusted by sieving, using a sieve appropriate for the desired particle size.

TABLE 1

| Sample Name | Primary particle size (μm) D10 | D50 | D90 |
|---|---|---|---|
| Sample 1 (size. 6) | 2.74 | 6.44 | 11.37 |
| Sample 2 (size. 10) | 4.29 | 10.62 | 19.17 |
| Sample 3 (size. 12) | 5.15 | 12.74 | 23.44 |
| Sample 4 (size. 15) | 6.89 | 15.66 | 27.59 |
| Sample 5 (size. 17) | 8.5 | 17.89 | 30.41 |

The pulverized coke primary particles were not subjected to any further drying process. After 12 hours of storage at room temperature, room temperature kneading was performed using a Nauta Mixer. The room temperature kneading condition was 1000 rpm, and the mixing operation was carried out for 1 hour using the rotation on its axis.

The heating and kneading process was followed by the secondary particle assembly process. The coke is loaded into the kiln for kneading. The amount of kneading once was 200 kg. The heat treatment kneader is a vertical reactor, and the coke was kneaded using an axis rotating blade at the center of the inside.

The kneading temperature, which is the internal temperature of the kneader, was set to the maximum of 400° C., and the temperature increase speed was 3° C./min, which was carried out at a low speed over about 2 hours and 10 minutes. Once the temperature reached 400° C., it was kept warm for 3 hours. In addition, to remove volatiles generated by heat during heat treatment kneading, $N_2$ gas was added to control the impurity content.

After air cooling to 100° C., the coke was discharged.

The discharged coke was kneaded for more than 1 hour in a Sigma blade type dispose type kneader.

The particle size and tap density of the final assembled coke secondary particles were then measured and are shown in Table 2 below.

TABLE 2

| Sample name | Secondary particle size after kneading (μm) D10 | D50 | D90 | Tap density of secondary particle (g/cc) |
|---|---|---|---|---|
| Sample 1 (size. 6) | 3.64 | 9.12 | 15.62 | 0.82 |
| Sample 2 (size. 10) | 6.03 | 14.53 | 25.03 | 0.75 |
| Sample 3 (size. 12) | 7.29 | 18.73 | 33.30 | 0.77 |
| Sample 4 (size. 15) | 9.58 | 22.24 | 38.43 | 0.93 |
| Sample 5 (size. 17) | 12.75 | 26.64 | 44.71 | 0.61 |

Considering the thickness of the negative electrode, sample 5 is not suitable. This is because the particle size is too large and could damage the electrode. The assembled sample was carbonized at 1000° C. for 1 hour. The rate of heating to carbonization temperature was 5° C./min.

The carbonized sample was loaded into an induction furnace and graphitized at 3000° C. for 1 hour. The rate of heating was 5° C./min, the same as for carbonization.

The electrochemical evaluation of the negative electrode active material of the reconstituted samples 1 to 5 was performed as follows.

(2) Preparation of Negative Electrode

A negative electrode active material slurry was prepared by mixing 97 wt % of the negative electrode active material of the samples 1 to 5, 2 wt % of a binder comprising carboxymethyl cellulose and styrene butadiene rubber, and 1 wt % of Super P conductive material in distilled water solvent.

The negative electrode active material slurry was applied to the copper (Cu) current collector, dried at 100° C. for 10 minutes, and pressed on a roll press. The negative electrode was then prepared by vacuum-drying in a 100° C. vacuum oven for 12 hours.

After vacuum-drying, the electrode density was made to be 1.5 to 1.7 g/cc.

(3) Manufacture of Lithium Secondary Batteries

The fabricated negative electrode and counter electrode were made of lithium metal (Li metal). As an electrolyte solution, ethylene carbonate (EC) and dimethyl carbonate (DEC) were used in a volume ratio of 1:1 to make a mixed solvent, and 1 mol of $LiPF_6$ solution was dissolved in it.

The configuration was used to manufacture a half coin cell of the 2032 coin cell type according to the conventional manufacturing method.

The discharge capacity at the time of charging and discharging three times and the efficiency at the time of charging and discharging once were measured using the manufactured half-cell.

TABLE 3

| Sample name | Discharge capacity (mAh/g) | efficiency(%) |
|---|---|---|
| Sample 1 (size. 6) | 349 | 93 |
| Sample 2 (size. 10) | 350 | 92 |
| Sample 3 (size. 12) | 353 | 93 |
| Sample 4 (size. 15) | 345 | 89 |
| Sample 5 (size. 17) | N/A | N/A |

The measurement result tor sample 5, the particle size was so large that it damaged the negative electrode and could not be measured.

Experimental Example 2—Electrochemical Performance Evaluation According to Organic Volatile Content In order to confirm the effect according to the organic volatile matter (VM) content, petroleum-based cokes having different organic volatile matter contents were prepared as shown in Table 4 below. The particle size was controlled the same as sample 3 (D50=12.74 μm).

Afterward, the negative electrode active material and negative electrode were manufactured by assembling with secondary particles in the same method as the Experimental Example 1, and composed of half cells. In addition, the electrochemical performance was evaluated using the same method as Experimental Example 1 and is shown in Table 4 below.

TABLE 4

| Sample name | Amount of VM (wt %) | Discharge capacity (mAh/g) | effi-ciency(%) | VM content after carbon-ization (wt %) | Tap density of a negative electrode active material (g/cc) |
|---|---|---|---|---|---|
| Sample 6 | 10 | 357 | 89 | 1 | 0.90 |
| Sample 7 | 15 | 355 | 91 | 2 | 0.95 |
| Sample 8 | 20 | 351 | 93 | 7 | 1.15 |
| Sample 9 | 25 | 348 | 88 | 9 | 0.75 |
| Sample 10 | 30 | 332 | 74 | 15 | 0.70 |

Based on the organic volatile content of the primary particles, it was found that 30 wt % was too high, and the volatile gases could be released rapidly when heated, causing the structure to crack, which adversely affects the electrochemical performance. In addition, if the organic volatile content is too low, the self-assembly using organic volatiles is not smooth, and the electrochemical performance is also measured to be poor. The tap density of the sample that has completed graphitization is 0.8 to 1.1. Considering the tap density of the primary particle state is 0.6 g/cc, we can see that assemble has definitely increased the tap density.

Experimental Example 3—Measurement of Capacity Retention Rate

The capacity retention was measured using the negative electrode material prepared in Experimental Examples 1 and 2.

The negative electrode was prepared using the negative electrode material prepared in Experimental Example 1 and 2, and lithium metal was used as the counter electrode, and 1 mole of $LiPF_6$ solution dissolved in a mixed solvent with a volume ratio of ethylene carbonate (EC):dimethyl carbonate (DMC) of 1:1 was used as the electrolyte solution. Half coin cell of 2032 coin cell type was manufactured according to the usual manufacturing method and tested.

The capacity retention rate was determined by measuring the number of charging and discharging cycles until the discharge capacity drops to 80% compared to the discharge capacity of 3 times charging and discharging cycles at room temperature 25° C.

TABLE 5

| Sample name | A Kind of material | Cycle |
|---|---|---|
| Sample 2 (VM 15 wt %) | Base on coal | 20 |
| Sample 3 (VM 15 wt %) | Base on coal | 27 |
| Sample 4 (VM 15 wt %) | Base on coal | 27 |
| Sample 6 (VM 10 wt %) | Base on petroleum | 21 |
| Sample 7 (VM 15 wt %) | Base on petroleum | 25 |
| Sample 8 (VM 20 wt %) | Base on petroleum | 29 |

TABLE 5-continued

| Sample name | A Kind of material | Cycle |
|---|---|---|
| Sample 9 (VM 25 wt %) | Base on petroleum | 21 |
| Sample 10 (VM 30 wt %) | Base on petroleum | 23 |
| Primary particle (based on particle size sample 3) | Base on coal | 8 |
| Primary particle (based on particle size sample 3) | Base on petroleum | 11 |

From the result, it can be seen that the capacity retention is very poor for negative electrode materials made of only primary particles. In addition, we can see that the capacity retention is greater than 20 cycles for both samples 2 to 4 and 6 to 10, especially in the assembled state. In other words, it was confirmed that samples 2 to 4 and 6 to 10 were formed from assembled secondary particles. In addition, after coating 3 wt % thermoplastic binder by weight of the negative electrode material, the same cycle-life test was performed after 1200 degrees carbonization, and the capacity retention cycle increased, confirming that the secondary particles were properly assembled.

The present invention is not limited to the exemplary embodiments, but may be made in a variety of different forms, and a person of ordinary skill in the technical field to which the present invention belongs will understand that it may be practiced in other specific forms without altering the technical idea or essential features of the present invention. Accordingly, the exemplary embodiments described above should be understood to be exemplary and non-limiting in all respects.

What is claimed is:

1. A method of manufacturing a negative electrode active material for lithium secondary battery:

preparing a primary particle by grinding a carbon source containing 15 to 25 wt % volatile matter;

heating and kneading the primary particle to assemble them into a secondary particle; and graphitizing the secondary particle;

wherein, the step of assembling the secondary particle is the step of heating and kneading only the primary particle without adding a binder.

2. The method of claim 1, wherein:

the carbon source is a petroleum-based green coke or a coal-based green coke or a mixture thereof.

3. The method of claim 1, wherein:

the carbon source is an isostatic coke or a needle coke or a mixture thereof.

4. The method of claim 1, wherein:

the step of heating and kneading a primary particle to assemble them into a secondary particle; is the process of heating and kneading from room temperature to 300 to 500° C. at a heating rate of at least 3° C./min.

5. The method of claim 1, wherein:

in the step of heating and kneading a primary particle to assemble it into a secondary particle, the kneading and assembling time is 10 minutes or more.

6. The method of claim 1, wherein:

before the step of heating and kneading a primary particle to assemble them into a secondary particle, a step of kneading a crushed primary particle at room temperature for at least 1 hour is further comprised.

7. The method of claim 1, wherein:

after the step of heating and kneading a primary particle to assemble them into a secondary particle, a step of cooling naturally the assembled secondary particle is further comprised.

8. The method of claim 7, wherein:

the step of natural cooling of the assembled secondary particle is performed for at least 1 hour in a sigma blade biaxial type mixer.

9. The method of claim 1, wherein:

in the step of preparing a primary particle by grinding a carbon source containing 10 to 25 wt % volatile matter, the grinded primary particle has a particle size D50 of 5 to 20 μm.

10. The method of claim 1, wherein:

after the step of heating and kneading a primary particle to assemble it into a secondary particle, a step of coating the secondary particle with a thermoplastic resin.

11. The method of claim 10, wherein:

the step of coating the secondary particle with a thermoplastic resin is performed by 1 to 5 wt % of the thermoplastic resin by weight of the secondary particle.

12. The method of claim 1, wherein:

before the graphitizing the secondary particle, a step of carbonizing the secondary particle is further comprised.

13. The method of claim 12, wherein:

the step of carbonizing the secondary particle is performed that the assembled secondary particle is carbonized at a temperature of 600 to 1500° C.

14. The method of claim 12, wherein:

the step of graphitizing the secondary particle is performed that the carbonized secondary particle is graphitized at a temperature of 2400 to 3300° C.

15. The method of claim 1, wherein:

the step of heating and kneading a primary particle to assemble them into a secondary particle is performed by one or more of the following:

a V-mixer, a Nauta mixer, and a generic Planetary mixer, or combination thereof.

* * * * *